United States Patent
Sommer et al.

(10) Patent No.: US 7,611,594 B2
(45) Date of Patent: Nov. 3, 2009

(54) METHOD OF MAKING A FIBER LAMINATE

(75) Inventors: Sebastian Sommer, Troisdorf (DE); Jens Güdden, Troisdorf-Spich (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 332 days.

(21) Appl. No.: 10/808,242

(22) Filed: Mar. 24, 2004

(65) Prior Publication Data
US 2004/0206442 A1   Oct. 21, 2004

(30) Foreign Application Priority Data
Apr. 2, 2003   (EP)  ................................. 03007612

(51) Int. Cl.
*B32B 37/24* (2006.01)
*D04H 3/10* (2006.01)
*D04H 3/14* (2006.01)
*B32B 5/26* (2006.01)

(52) U.S. Cl. .................. 156/148; 28/104; 156/167; 156/290; 442/384; 442/408

(58) Field of Classification Search .............. 156/167, 156/148, 181, 441, 290; 28/104, 105; 442/408, 442/382–384
See application file for complete search history.

(56) References Cited

U.S. PATENT DOCUMENTS

| 3,485,706 | A  | * | 12/1969 | Evans ........................... 28/105 |
| 4,223,063 | A  | * | 9/1980  | Sabee ........................... 28/100 |
| 6,110,848 | A  | * | 8/2000  | Bouchette ................... 442/384 |
| 6,177,370 | B1 | * | 1/2001  | Skoog et al. ................. 442/384 |
| 6,836,938 | B2 | * | 1/2005  | Fleissner ..................... 28/104 |
| 7,022,201 | B2 | * | 4/2006  | Anderson et al. ........... 442/384 |
| 2004/0137200 | A1 | * | 7/2004  | Chhabra et al. ............. 428/167 |
| 2004/0154731 | A1 | * | 8/2004  | Sommer et al. ............. 156/167 |
| 2005/0085149 | A1 | * | 4/2005  | Sommer ..................... 442/408 |
| 2005/0188513 | A1 | * | 9/2005  | Vuillaume et al. ............ 28/104 |

OTHER PUBLICATIONS

English translation of DIN 53815 by BSI Language Services (1989).

* cited by examiner

*Primary Examiner*—Steven D Maki
(74) *Attorney, Agent, or Firm*—Andrew Wilford

(57) ABSTRACT

An absorbent wiping cloth can be made by hydraulic bonding of hydrophilic fibers with a prebonded spunbond filament layer. A further spunbond filament layer can be provided on the fiber side of this laminate.

13 Claims, 2 Drawing Sheets

METHOD OF MAKING A FIBER LAMINATE

FIELD OF THE INVENTION

Our present invention relates to a method of making a fiber laminate, especially a laminate containing fibers from a fiber layer interlaced into a filament layer and especially a spunbond nonwoven fabric layer. More particularly the invention relates to a method for the manufacture of a fiber laminate, in particular of an absorbent wiping cloth, made of at least one nonwoven fleece of filaments, and at least one fiber layer made of hydrophilic fibers. The term "fiber laminate" within the framework of the invention therefore means a laminate consisting of at least one fiber layer made of hydrophilic fibers and at least one layer of filaments. The term "filaments" is understood to mean endless filaments, i.e. theoretically endlessly long filaments from which the spunbonded nonwoven fabric is formed. A distinction is to be drawn between this and the fibers, which are relatively short threads or which are in any event on average shorter than the aforesaid filaments. The term "filaments" within the framework of the invention is understood to mean in particular filaments made of a thermoplastic material.

BACKGROUND OF THE INVENTION

Fiber laminates and wiping cloths of the type referred to above are already known. These products, however, have not proved their value, in particular in comparison with fiber laminates, which instead of filaments contain only short fibers. The known fiber laminates with spunbonded fleece materials made of filaments are characterized in particular by a disadvantageous surface behavior when subjected to abrasive stress. This is attributable to the fact that the endless filaments are less movable because of their being tensioned in the nonwoven fabric on both sides, and therefore can only with difficulty be looped with adjacent filaments of the fiber layer. In the event of abrasive stress being applied to these known fiber laminates, the fibers accordingly come free of the surface relatively easily. This is not acceptable for the use of such a fiber laminate as a wiping cloth.

OBJECTS OF THE INVENTION

It is, therefore, the principal object of the present invention to provide a method of making a fiber laminate for the purposes described which is free from the drawbacks of losing fibers from the laminate when the fabric is in use.

More particularly it is an object of the invention to provide an improved method of making such a laminate whereby the fibers are bonded more firmly and permanently with the filament layer structure.

It is also an object of this invention to provide a method of making a laminate which is particularly suitable for use as a wiping cloth and especially a wiping cloth having water-absorbent capability.

SUMMARY OF THE INVENTION

These objects and others which will become apparent hereinafter are attained, in accordance with the invention in a method which comprises the steps of:

(a) forming a nonwoven spunbond filament layer;

(b) prebonding the nonwoven spunbond filament layer to a tensile strength of at least 50% of the tensile strength thereof at maximum bonding to form a prebonded nonwoven spunbond filament layer;

(c) applying at least one layer of hydrophilic fibers onto the prebonded nonwoven spunbond filament layer; and (d) hydrodynamically bonding the layer of hydrophilic fibers to the spunbond filament layer to create a two-layer laminate forming an absorbent cloth.

While the reference to a tensile strength which is at least 50% of the tensile strength of the spunbond at maximum bonding can utilize the German Industrial Standard or ISO standard referred to below as a basis, for any spunbond layer it is a simple matter to measure the tensile strength with varying degrees of bonding and to use the tensile strength where the maximum bonding is reached as the basis for determining the value which is at least 50% thereof.

The method of the invention thus is a method for the manufacture of a fiber laminate, in particular of an absorbent wiping cloth, whereby at least one spunbonded nonwoven fabric made of filaments is subjected to preliminary bonding such that the pre-bonded spunbonded nonwoven fabric has a high tensile strength capacity which amounts to at least 50% of the tensile strength capacity of the spunbonded nonwoven fabric at maximum bonding of the spunbonded fabric, whereby at least one fiber layer of hydrophilic fibers is applied to the pre-bonded spunbonded nonwoven fabric, and whereby the laminate is hydrodynamically bonded from spunbonded nonwoven fabric and fiber layer. The aforesaid high tensile strength capacity is derived from and defined in DIN (German Industrial Standard) 53815 and EN ISO 5079.

It falls within the framework of the invention that the spunbonded nonwoven fabric is pre-bonded with a calender, in particular with a hot embossing calender. The aforementioned high tensile strength capacity of the spunbonded nonwoven fabric at maximum pre-bonding of the fabric is derived as follows. The contact pressure and/or the surface temperature of the calender or the calender rolls respectively are initially so varied that the maximum and highest possible tensile strength capacity is derived for the spunbonded nonwoven fabric which is pre bonded in this way. In this situation, this therefore involves the greatest possible tensile strength capacity of this spunbonded nonwoven fabric at maximum bonding. In order to set a value according to the invention of at least 50% of the maximum tensile strength capacity, therefore, it is then to the purpose, under conditions which are otherwise the same (such as the determination of the maximum tensile strength capacity), for the contact pressure and/or the surface temperature of the calender or the calender rolls to be changed until the high tensile strength capacity according to the invention is attained. According to the invention, the arrangement of the connection points produced during the pre-bonding process, or bonding points respectively, is to be effected in the spunbonded nonwoven fabric in such a way that an optimum compromise is attained between the closed surface of the nonwoven fabric (narrow distance interval between the bonding points) and good needling capability (greater distance interval between the bonding points).

With the method according to the invention, it is to the purpose to work with conventional embossing calenders or hot-embossing calenders. As a calender pattern, in this situation regular and/or irregular point patterns can be used, as well as open and/or closed line patterns. During the calendering, an embossing cylinder can work against a smooth roller or even an embossing cylinder against an embossing cylinder. With the embodiment of "embossing cylinder against embossing cylinder", both an engraving projection of the individual cylinder can work against an engraving projection of the other cylinder, as well as an engraving projection of the one cylinder against an engraving depression. It lies within the framework of the invention that the nonwoven fleece strip is already deformed in three dimensions during the pre-bonding, in order to obtain a higher volume in the end product.

For the manufacture of the spunbonded nonwoven fleece, within the framework of the invention filaments are used with a fineness or with a diameter from 0.3 to 3 Denier, for preference 0.5 to 2.5 Denier, and for particular preference 0.8 to 1.5 Denier. To the purpose, the fineness or the diameter of the filaments of the spunbonded nonwoven fabric is below 1.5 Denier.

According to one embodiment of the invention, the filaments of the spunbonded nonwoven fabric consist at least in part of bicomponent filaments. In this situation, bicomponent filaments with a core-sheath arrangement have proved their worth in particular. It lies within the framework of the invention for the spunbonded nonwoven fabric consists of a plurality of nonwoven fabric layers or filament layers. The filaments of the individual layers can in this situation exhibit different properties.

As already indicated heretofore, during the pre-bonding of the spunbonded nonwoven fabric connection points or bonding points are produced between the filaments of the spunbonded nonwoven fabric. To the purpose, a pre-bonding of the spunbonded nonwoven fabric is carried out under the proviso that the maximum free path length determined between two bonding points of the spunbonded nonwoven fabric is less than 15 mm.

According to a preferred embodiment of the invention, the pre-bonded spunbonded nonwoven fabric is deformed, and, specifically and to the purpose, before the application of the fiber layer of hydrophilic fibers, In this situation it lies within the framework of the invention that the deformation takes place transverse to the flat face of the nonwoven fabric or to its surface, such as perpendicular to the surface or obliquely to the surface. The deformation is carried out so that the thickness of the pre-bonded spunbonded nonwoven material is increased as a result of the deformation. The deformation according to the invention of the pre-bonded spunbonded nonwoven material is effected in particular if it is intended that the thickness or the volume of the fiber laminate being manufactured still leaves something to be desired or should be increased. The deformation can, for example, be carried out with the aid of hydraulic forces on the drum of a hot-air drum dryer, or carried out by a suction roller. It also lies within the framework of the invention that the deformation of the pre-bonded spunbonded nonwoven material takes place between two surfaces which interact or are immersed into one another, in that, for example, a rubber or brush roller works against a metal roller with a grained surface, or by pleating or the like. A deformation of the pre-bonded spunbonded nonwoven fabric can also be effected by means of grooved or otherwise irregularly arranged surfaces. It lies within the framework of the invention for the deformation step of the method to be carried out at a temperature below the melting temperature of the filaments, and with bicomponent fibers or multicomponent fibers, below the melting point of the lower melting components. For preference, the deformation takes place in the temperature range between the softening point and the melting point of the filaments.

According to a very preferred embodiment, which acquires very particular significance within the framework of the invention, the pre-bonded spunbonded nonwoven material is treated with at least one wetting agent prior to the hydrodynamic bonding process. In this situation it falls within the scope of the invention that at least one tenside (surface active agent) is used as the wetting agent. Such a tenside used in accordance with the invention exhibits a lipophilic and a hydrophilic part, or a lipophilic and a hydrophilic end. Tensides have proved their worth within the framework of the method according to the invention for the treatment of the pre-bonded spunbonded nonwoven material. As wetting agent, ionic, i.e. cationic and/or anionic tensides can be used, or even non-ionic tensides. According to one embodiment of the invention, ampho-tensides are used as wetting agents.

It lies within the framework of the invention that, after the treatment with the wetting agent, first a drying of the pre-bonded spunbonded nonwoven material can take place. According to a preferred embodiment, the pre-bonded spunbonded nonwoven material can be conducted to the hydrodynamic pre-bonding stage after treatment with the wetting agent even without prior drying. This latter embodiment has proved its value in particular.

Before the hydrodynamic pre-bonding, the fiber layer made of the hydrophilic fibers is applied onto the pre-bonded spunbonded fleece material. The hydrophilic fibers are water-absorbent fibers, As hydrophilic fibers, use may be made in particular of cellulose fibers, such as pulp fibers. The fiber layer made of hydrophilic fibers at the same time forms an absorbent layer of the fiber laminate according to the invention, whereby at least a part of the hydrophilic fibers pass through the hydrodynamic pre-bonding into the intermediate spaces of the minimum of one spunbonded nonwoven layer. According to a very preferred embodiment of the invention, the hydrophilic fibers are applied with the aid of at least one carding machine and/or with at least an air-laid device onto the pre-bonded spunbonded nonwoven material.

It lies within the framework of the invention that at least one second spunbonded nonwoven material is applied onto the laminate formed from the minimum of one spunbonded nonwoven material and the fiber layer of hydrophilic fibers, and specifically, to the purpose, before the hydrodynamic bonding. The second spunbonded nonwoven material is in this case, to the purpose, applied directly onto the fiber layer made of hydrophilic fibers. Accordingly, this preferred fiber laminate exhibits the layer sequence of spunbonded nonwoven material—fiber layer—spunbonded nonwoven material.

The second spunbonded nonwoven material is likewise treated in the same manner as the first spunbonded nonwoven material before being applied to the laminate. To the purpose, the second spunbonded nonwoven material is pre-bonded with a calender or hot-embossing calender in the manner according to the invention, and for preference then treated with at least one wetting agent. A spunbonded nonwoven material strip or a fiber layer respectively can, within the framework of the invention, on the one hand be delivered as an already finished layer, for example from a roll. According to another embodiment, the spunbonded nonwoven material and/or the fiber layer can be delivered directly from a corresponding manufacturing system.

It lies within the framework of the invention that the laminate, made of spunbonded nonwoven material or materials and fiber layer, is bonded hydrodynamically by a water-jet treatment. With such water-jet bonding or water-jet needling, fine and very high-speed water jets or high-pressure water jets bond the nonwoven fleece material. According to a very preferred embodiment of the invention, the spunbonded nonwoven material part of the fiber laminate manufactured according to the invention amounts to less than 50% by weight.

The invention is based on the recognition that, with the method according to the invention, a fiber laminate can be manufactured which exhibits at least one layer of endless fibers (filaments) and a further layer of shorter hydrophilic fibers, and which is characterized by excellent surface properties and, in particular, is excellent for use as a wiping cloth. It is possible, within the framework of the method according to the invention, for an optimum bonding or looping of spunbonded nonwoven material and fiber layer to be manufactured, which leads to the situation that the fiber laminate also satisfies all the requirements even under mechanical stresses or abrasive stresses. It is further to be emphasized that the fiber laminate according to the invention can be manufactured relatively easily and with little cost and effort. In this sense, the method according to the invention is also characterized by its great economy.

BRIEF DESCRIPTION OF THE DRAWING

The above and other objects, features, and advantages will become more readily apparent from the following description, reference being made to the accompanying drawing in which.

SPECIFIC DESCRIPTION

Figure 3:
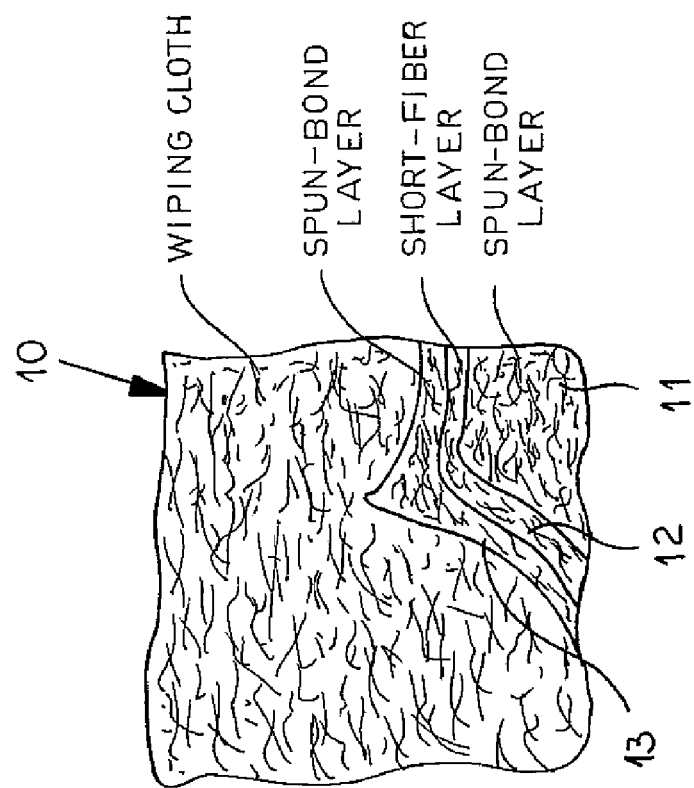
FIG. 3 is a diagram of the cloth which is formed.
Figure 2:
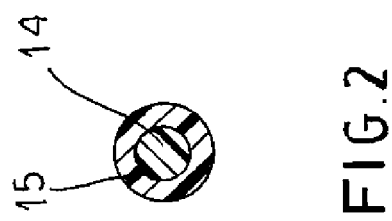
FIG. 2 is a cross section through a filament which can be used for the spunbond.

Referring first to FIG. 3 which shows a wiping cloth 10 with water absorption properties, it can be seen that this cloth can consist of a spunbond layer 11, prebonded as has been described, and formed of continuous filaments, into which the short fibers of layer 12 have been interlaced by the hydraulic needling and which may be laminated further to another prebonded spunbond layer 13 with the short fibers interlaced therein as well. The filaments may have a core 14 of one thermoplastic material covered by a sheath 15 of another thermoplastic material so that the surface characteristics of the sheath 15 (FIG. 2) can be beneficial while the strength of the core 14 is available for he filament.

Figure 1:
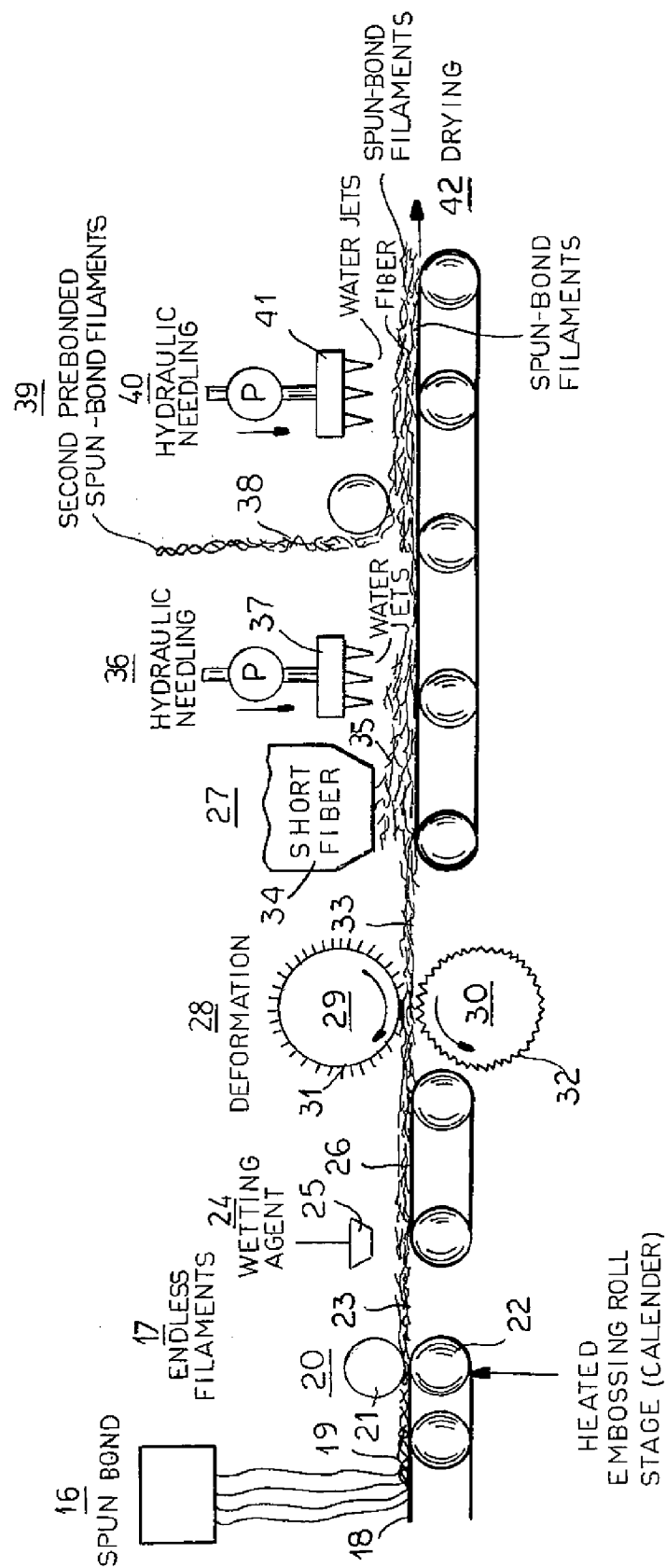
FIG. 1 is a diagram illustrating the method of the invention.

In FIG. 1 we have shown a spunbond stage 16 in which the curtain of endless thermoplastic filaments 17 is collected on a perforated belt 18 to form the spunbond layer 19 which may be referred to as a fleece, mat or nonwoven layer.

This layer is prebonded in a prebonding stage 20 by passing it, for example, between heated embossing rolls 21, 22 of a calender. The prebonded spunbond layer 23 can be treated with a wetting agent in a further stage 24, e.g. by a spray head 25. The treated prebonded spunbond layer 26 may be then delivered to the short fiber application at stage 27 or subjected to deformation at 28 by passing the prebonded layer 26 between a pair of drums 29, 30, one of which is shown to be equipped with a brush 31 while the other has a corrugated surface 32 to bulk up or increase the thickness of the prebonded layer. In FIG. 1, the thicker prebonded layer is shown at 33. The short fibers are applied to the prebonded layer at 27 by one or more carding devices or an air layering device 34 so that a short fiber layer 35 is formed on the prebonded layer 33.

In the hydraulic needling stage 36, high pressure water jets 37 are directed upon the laminate to interlace the fibers 35 with the spunbond layer 33. Then a second prebonded spunbond filament layer 38 can be applied to the laminate at stage 39 and in a further stage 40, hydraulic needling with water jets 41 can cause interlacing of the fibers and the filaments of the second layer. The resulting laminate may be dried at 42 and cut up into wiping cloths.

We claim:

1. A method of making a fiber laminate, the method comprising the steps of sequentially:
    forming a nonwoven spunbond filament layer of predetermined characteristics;
    initially bonding the nonwoven spunbond filament layer in a calender comprising calender rolls by varying contact pressure and/or surface temperature of the calender rolls to obtain a nonwoven spunbond filament layer having varying degrees of bonding, measuring tensile strength of the nonwoven spunbond filament layer having varying degrees of bonding to obtain varying tensile strengths, and determining highest tensile strength from the varying tensile strengths, the nonwoven spunbond filament layer having the highest tensile strength being the nonwoven spunbond filament layer at maximum bonding;
    thereafter prebonding the nonwoven spunbond filament layer to a tensile strength of at least 50% of the tensile strength thereof at maximum bonding under conditions that are otherwise the same as in the step of initially bonding the nonwoven spunbond filament layer by adjusting the contact pressure and/or the surface temperature of the calender rolls to form a prebonded nonwoven spunbond filament layer;
    treating the prebonded nonwoven spunbond filament layer with at least one wetting agent;
    applying at least one layer of hydrophilic fibers onto the prebonded nonwoven spunbond filament layer treated with the wetting agent; and
    hydrodynamically bonding the layer of hydrophilic fibers to the spunbond filament layer to create a two-layer laminate forming an absorbent cloth.

2. The method defined in claim 1 wherein the calender has at least one heated embossing drum cylinder.

3. The method defined in claim 2 wherein the prebonding is carried out such that a maximum free filament length between two bonding points of the nonwoven spunbond layer is less than 15 mm.

4. The method defined in claim 3, further comprising the step of
    additionally deforming the prebonded nonwoven spunbond filament layer to increase the thickness thereof.

5. The method defined in claim 4 wherein the hydrophilic fibers are applied by at least one carding machine or at least one air-layering device onto the prebonded nonwoven spunbond filament layer.

6. The method defined in claim 5, further comprising the step of
    applying a second spunbond nonwoven material onto the laminate formed by the layers.

7. The method defined in claim 6 wherein the hydrodynamic bonding of the layers into the laminate is effected by a water-jet treatment thereof.

8. The method defined in claim 1 wherein the prebonding is carried out such that a maximum free filament length between two bonding points of the nonwoven spunbond layer is less than 15 mm.

9. The method defined in claim 1, further comprising the step of
    additionally deforming the prebonded nonwoven spunbond filament layer to increase the thickness thereof.

10. The method defined in claim 1 wherein the wetting agent is at least one tenside or surface active agent.

11. The method defined in claim 1 wherein the hydrophilic fibers are applied by at least one carding machine or at least one air-layering device onto the prebonded nonwoven spunbond filament layer.

12. The method defined in claim 1, further comprising the step of applying a second spunbond nonwoven material onto the laminate formed by the layers.

13. The method defined in claim 1 wherein the hydrodynamic bonding of the layers into the laminate is effected by a water-jet treatment thereof.

* * * * *